US012164306B1

(12) United States Patent
Filarsky et al.

(10) Patent No.: US 12,164,306 B1
(45) Date of Patent: Dec. 10, 2024

(54) ADAPTABLE ORIGIN FOR LOCATION OFFSETS

(71) Applicant: Zoox, Inc., Foster City, CA (US)

(72) Inventors: Brian Michael Filarsky, San Francisco, CA (US); Joseph Funke, Redwood City, CA (US); Mark Jonathon McClelland, San Francisco, CA (US); Amirhossein Tamjidi, Foster City, CA (US); Olivier Toupet, Stevenson Ranch, CA (US)

(73) Assignee: Zoox, Inc., Foster City, CA (US)

( * ) Notice: Subject to any disclaimer, the term of this patent is extended or adjusted under 35 U.S.C. 154(b) by 140 days.

(21) Appl. No.: 17/531,534

(22) Filed: Nov. 19, 2021

(51) Int. Cl.
*G05D 1/00* (2024.01)
*B60W 30/095* (2012.01)
*B60W 40/06* (2012.01)

(52) U.S. Cl.
CPC ......... *G05D 1/0274* (2013.01); *B60W 30/095* (2013.01); *B60W 40/06* (2013.01); *G05D 1/0219* (2013.01); *G05D 1/0223* (2013.01); *G05D 1/0272* (2013.01); *G05D 1/0278* (2013.01); *B60W 2530/18* (2013.01); *B60W 2554/4041* (2020.02)

(58) Field of Classification Search
CPC ........... B60W 30/095; B60W 2530/18; B60W 2554/4041; B60W 10/00–2900/00; B60W 60/00–60/007; B60W 40/00–40/13; G05D 1/0274; G05D 1/0219; G05D 1/0223; G05D 1/0272; G05D 1/0278; G05D 2201/0213; G05D 10/00–2900/00; G05D 1/00–2111/00

USPC .......................................................... 701/25
See application file for complete search history.

(56) References Cited

U.S. PATENT DOCUMENTS

| | | | |
|---|---|---|---|
| 7,734,387 B1* | 6/2010 | Young ................. | G05D 1/0278 701/533 |
| 10,934,964 B1* | 3/2021 | Christensen ........ | F02D 41/2432 |
| 11,312,353 B2* | 4/2022 | Johnson ............... | B60W 10/18 |
| 2013/0041549 A1* | 2/2013 | Reeve .................. | G05D 1/0272 701/28 |
| 2015/0293232 A1* | 10/2015 | Crawford ............. | G01S 19/396 342/357.43 |
| 2016/0152239 A1* | 6/2016 | Kondoh ................ | B60W 50/06 701/1 |
| 2018/0107215 A1* | 4/2018 | Djuric .................. | G05D 1/0088 |
| 2019/0186939 A1* | 6/2019 | Cox ....................... | G06N 20/00 |
| 2019/0257664 A1* | 8/2019 | Matsuda .............. | G05D 1/0217 |
| 2019/0384303 A1* | 12/2019 | Muller .................. | G08G 1/166 |

(Continued)

*Primary Examiner* — Mohamed Abdo Algehaim
(74) *Attorney, Agent, or Firm* — EIP US LLP

(57) ABSTRACT

Techniques are described for determining to modify a coordinate system in response to the occurrence of a condition. As non-limiting examples, such conditions comprise distance traveled, speed of the vehicle (or system), an amount of computational resources available, a time since the last change, a number of objects present, the presence (or absence) of a particular object proximate the vehicle, a distance to a proximate object, based on a particular frequency, or the like. Such modifications may improve the operation and safety of a computing system used for path planning and trajectory generation by allowing lower precision numerical representations to be used in safety-critical situations while avoiding potential computational errors that would otherwise result from using such a representation.

19 Claims, 5 Drawing Sheets

(56) References Cited

U.S. PATENT DOCUMENTS

| | | | |
|---|---|---|---|
| 2020/0001856 A1* | 1/2020 | Johnson | B60W 30/0956 |
| 2020/0055515 A1* | 2/2020 | Herman | G06N 3/047 |
| 2020/0117199 A1* | 4/2020 | Akella | G08G 1/166 |
| 2020/0125091 A1* | 4/2020 | Zhu | G01C 25/00 |
| 2020/0142417 A1* | 5/2020 | Hudecek | B60W 30/0953 |
| 2020/0209857 A1* | 7/2020 | Djuric | G05D 1/0221 |
| 2020/0240794 A1* | 7/2020 | Prasser | G01C 21/3819 |
| 2020/0257301 A1* | 8/2020 | Weiser | G06N 3/02 |
| 2020/0341469 A1* | 10/2020 | Smolyanskiy | G06V 20/588 |
| 2021/0003415 A1* | 1/2021 | Milstein | G01C 21/3815 |
| 2021/0181756 A1* | 6/2021 | Zhu | G05D 1/0212 |
| 2021/0298552 A1* | 9/2021 | Couvignou | G05D 1/0212 |
| 2021/0403032 A1* | 12/2021 | Jing | G05D 1/0022 |
| 2022/0092412 A1* | 3/2022 | Srivastava | B60W 60/00 |
| 2022/0097765 A1* | 3/2022 | Rajaie | G05D 1/0223 |
| 2022/0187843 A1* | 6/2022 | Wang | G01C 21/20 |
| 2022/0282990 A1* | 9/2022 | Reuveni | G08G 1/04 |
| 2022/0315023 A1* | 10/2022 | Ishii | B62D 15/0285 |
| 2022/0333950 A1* | 10/2022 | Akbarzadeh | G01C 21/3804 |
| 2022/0396289 A1* | 12/2022 | Li | G01C 21/3407 |
| 2022/0404829 A1* | 12/2022 | Nister | G05D 1/0212 |

* cited by examiner

ADAPTABLE ORIGIN FOR LOCATION OFFSETS

BACKGROUND

An autonomous electric vehicle may move through an environment following a trajectory determined at least in part by other static and moving objects within the environment, and the vehicle's location relative to those objects. To achieve this, the autonomous electric vehicle may have one or more components that receive information about its surrounding environment, including static and moving objects in the environment, and determine an appropriate trajectory based on the received information.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
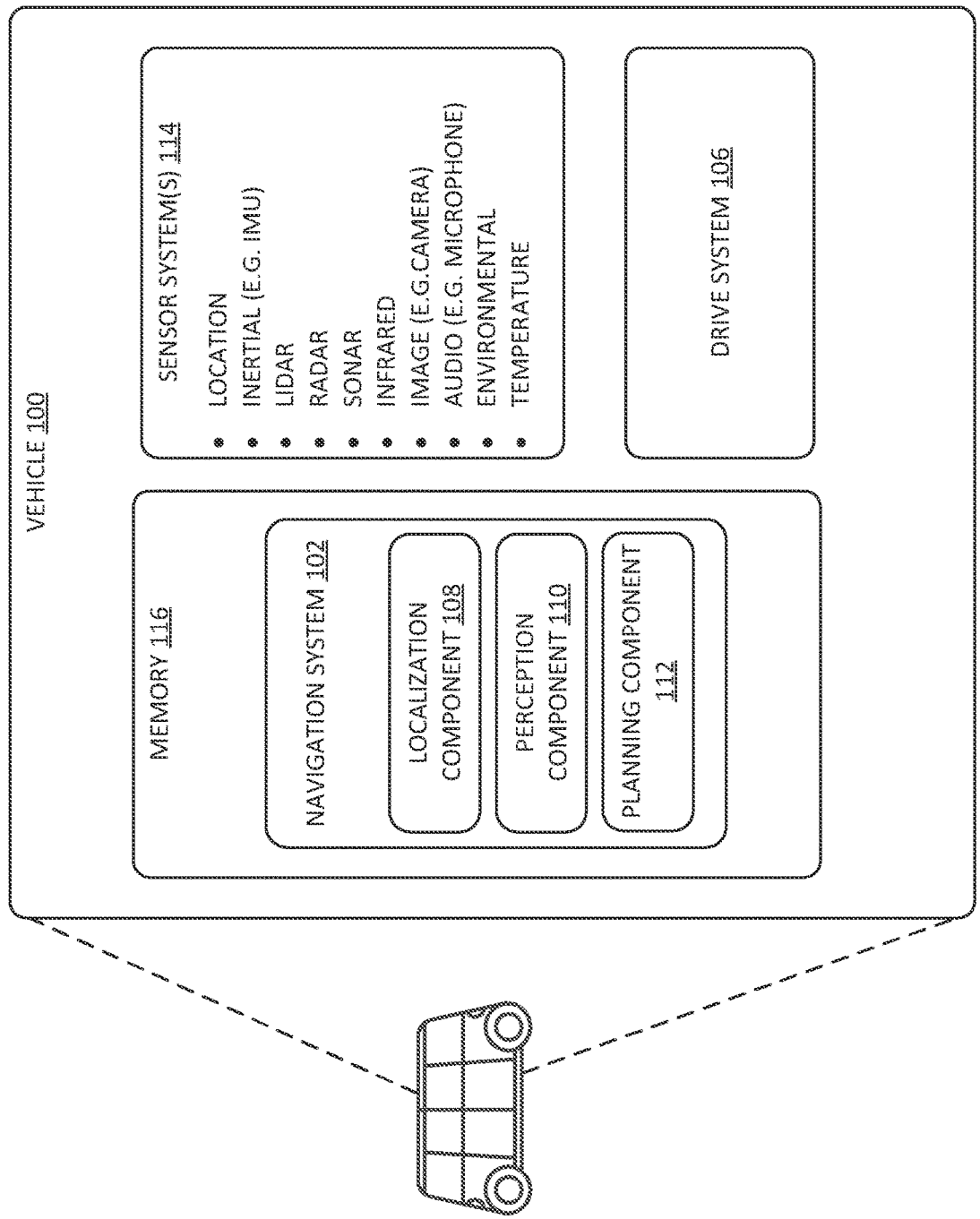
FIG. 1 is a schematic illustration of a vehicle.

This application relates to dynamic modification of a coordinate system in which positional information relating to a vehicle and its surrounding environment is measured, with the dynamic modification taking place in response one or more conditions. By modifying such a coordinate system, the numerical values used to represent the positional information relative to an origin of the coordinate system may remain relatively small throughout operation of the vehicle, which may facilitate storing and/or using the positional information as single-precision floating-point data. Single-precision floating-point data may require less storage than, for example, double-precision floating-point data, and may enable use of more computationally efficient calculations than, for example, double-precision floating-point data.

The condition may take several forms, including the start or end of a cycle of determining updated positional information, an availability of computing resource of the vehicle, an indication that the vehicle is travelling below a certain speed or not travelling at all, an indication that the vehicle has travelled more than a certain distance from the position at which the vehicle was turned on, an indication that the vehicle is travelling in a particular region or on a particular type of road, or an indication that there are relatively few objects surrounding the vehicle. Any one of these conditions may indicate a beneficial time to modify the coordinate system. Such beneficial times may comprise a subset of times at which the vehicle is using relatively little of its available computational resource, which may assist with safe and reliable operation of the vehicle.

The positional information may also take several forms, including information relating to a planned trajectory for the vehicle. For example, a controller of an autonomous vehicle may determine a planned trajectory for the vehicle to take based on received information about its surrounding environment, including static and moving objects in the environment. Such a planned trajectory may include discrete positional coordinates which are measured relative to an origin of a coordinate system. If the coordinate system is static, for example taking the form of a global coordinate system of the vehicle, having an origin corresponding to a position of the vehicle on start-up of the vehicle, then as the vehicle travels through an environment the values needed to represent a trajectory may become increasingly large. Such large values may need to be stored as double-precision floating-point data to ensure accuracy when performing arithmetic operations, but double-precision floating-point data may be computationally inefficient relative to single-precision floating-point data. In particular, rounding errors can occur when representing large numerical values using single-precision floating-point data, which can lead to inaccuracies in the planned trajectory. By dynamically modifying a coordinate system in which the positional information is measured, as discussed above, use of single-precision floating-point data, which may be more computationally efficient and better suited to real-time computing for a vehicle in comparison with double-precision floating-point data, may be enabled, with low numerical values leading to reduced rounding errors and hence more accurate positional information.

Accordingly, techniques (including, but not limited to, a method, a vehicle, and one or more non-transitory computer-readable media) may be provided as discussed herein. For example, methods may comprise determining a further coordinate system, different to a previously utilised coordinate system, based at least in part on one or more determined conditions, and determining at least one trajectory with reference to the further coordinate system. In such a manner a magnitude of the location points within their respective coordinate systems may be kept relatively small, for example compared to a method where a single coordinate system having a single origin point is used, which may enable storing of the location points as single-precision floating-point data, leading to greater computational efficiency, whilst also resulting in a lower risk of rounding errors compared to utilization of larger numbers in single-precision floating-point arithmetic.

The condition may comprise one or more of: a start or end point of a cycle of a trajectory planner associated with at least one of the planned trajectory or the additional planned trajectory, an availability of computing resource of the vehicle, a speed of the vehicle is less than or equal to a speed threshold, the vehicle is stationary, the vehicle has travelled a distance greater than or equal to a threshold distance, the vehicle is travelling on a road type, the vehicle is travelling on a type of road surface, the vehicle is travelling in a geographic location, a number of objects proximate the vehicle is less than or equal to a numerical threshold, an object proximate the vehicle is of a class, or an object is less than or equal to a threshold distance from the vehicle.

A cycle of a trajectory planner may be relatively short, for example of the order of hundreds of microseconds or less to ensure accurate and up-to-date trajectories. Thus by determining a further coordinate system at the start or end point of a cycle of a trajectory planner, the values of the location points of trajectories may be kept relatively small which may enable storing of the location points as single-precision floating-point data, leading to greater computational efficiency, whilst also resulting in a lower risk of rounding errors compared to utilization of larger numbers in floating-point arithmetic. Furthermore, by determining a further coordinate system at the start or end point of a cycle of a trajectory planner testing and validation of the method in a vehicle in which the method is utilised may be facilitated, compared to, for example, a method where the vehicle has to travel a certain relatively large distance before determination of the further coordinate system occurs.

By determining a further coordinate system based at least in part on an availability of computing resource of the vehicle, for example where availability of computing resource is relatively high, safe and reliable operation of the vehicle may be facilitated. For example, determining the further coordinate system where availability of computing resource is high may ensure that computing resource is available for other safety critical tasks.

By determining a further coordinate system where a speed of the vehicle is less than or equal to a speed threshold, for example where the vehicle is stationary, sudden changes in vehicle trajectory due to determination of the further coordinate system may be avoided. By determining a further coordinate system where the vehicle is travelling on a road type, where the vehicle is travelling in a geographic location, or where a number of objects proximate the vehicle is less than or equal to a numerical threshold, determination of the further coordinate system may take place in a scenario where it has been determined that it is appropriate for such shifting to occur. These conditions may comprise a subset of conditions associated with times of lower computational resource for the vehicle, which may provide improved safety and reliability relative to a vehicle where determining a further coordinate system takes place when safety critical systems require larger amounts of computational resource. By determining a further coordinate system where the vehicle has travelled a distance greater than or equal to a threshold, the values of the location points of trajectories may be kept relatively small in the manner previously described.

In some examples methods include storing offsets between determined coordinate systems. This may enable positional information in one coordinate system to be converted into another coordinate system. This may find particular utility where one or more vehicle components require use of positional information in a particular coordinate system. For example, a first coordinate system may comprise a global coordinate system obtained on start-up of the vehicle, and a further, local, coordinate system may be determined in the manner previously described to maintain the numerical values as relatively low values. However, some vehicle components may require positional information in the global coordinate system as input data in order to operate. By storing the offset between a local coordinate system and a global coordinate system, the methods described herein may enable conversion of positional information from the local coordinate system to the global coordinate system, enabling correct operation of further vehicle component.

A vehicle 100 is illustrated schematically in the block diagram in FIG. 1. The vehicle 100 in the example of FIG. 1 can include a navigation system 102, and a drive system 106.

The navigation system 102 can be configured to determine positional information for controlling the vehicle 100, for example positional information that can be acted upon to cause the drive system 106 to move the vehicle 100. Such positional information can take several forms, and can be derived from several sources. In the example of FIG. 1, the navigation system 102 can comprise a localization component 108, a perception component 110, a planning component 112 and a sensor system(s) 114. It will be appreciated that some components of the navigation system 102, such as the localization component 108, the perception component 110, and the planning component 112 can reside in memory 116 of the vehicle 100.

In at least one example, the localization component 108 can include functionality to receive data from the sensor system(s) 114 to determine a position and/or orientation of the vehicle 100 (e.g., one or more of an x-, y-, z-position, roll, pitch, or yaw). For example, the localization component 108 can include and/or request/receive a map of an environment and can continuously determine a location and/or orientation of the autonomous vehicle within the map. In some instances, the localization component 108 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 114 or received from one or more other devices to accurately determine a location of the vehicle 100. In some instances, the localization component 108 can provide data to various components of the vehicle 100 to determine an initial position of the autonomous vehicle for generating a trajectory and/or for determining to retrieve map data. Such data can be considered positional information as discussed herein.

In at least one example, the sensor system(s) 114 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 114 can include multiple instances of each of these or other types of sensors. For instance, the lidar sensors can include individual lidar sensors located at the corners, front, back, sides, and/or top of the vehicle 100. As another example, the image sensors can include multiple image sensors disposed at various locations about the exterior and/or interior of the vehicle 100. As an even further example, the audio sensors can include multiple audio sensors disposed at various locations about the exterior and/or interior of the vehicle 100. Additionally, the audio sensors can include an array of a plurality of audio sensors for determining directionality of audio data.

In some instances, the perception component 110 can include functionality to perform object tracking, detection, segmentation, and/or classification. In some examples, the perception component 110 can provide processed sensor data that indicates a presence of an entity that is proximate to the vehicle 100 and/or a classification of the entity as an entity type (e.g., car, pedestrian, cyclist, animal, building, tree, road surface, curb, sidewalk, unknown, etc.). In additional and/or alternative examples, the perception component 110 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. In some examples the perception component can provide predictions regarding future positions and/or orientations of detected entities, along with associated certainties. It will be appreciated that at least some of the aforementioned characteristics can be considered positional information as discussed herein.

In general, the planning component 112 can determine a path for the vehicle 100 to follow to traverse through an environment. For example, the planning component 112 can determine various routes and trajectories and various levels of detail. For example, the planning component 112 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 112 can generate an instruction for guiding the vehicle 100 along at least a portion of the route from the first location to the second location. In at least one example, the planning component 112 can determine how to guide the vehicle 100 from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 100 to navigate. It will be appreciated that the waypoints and trajectories can be considered positional information as discussed herein.

For the examples of positional information given in relation to the localization component 108, the perception component 110, and the planning component 112, such positional information can be measured relative to an origin point or a coordinate system. Typically a global coordinate system can be obtained on start-up of a vehicle, with the global coordinate system having an origin point set to be a location of the vehicle, for example a location of the vehicle obtained by the localization component 108, on start-up. The positional information can be stored in the memory 116 of the vehicle for use by various components of the vehicle. Given that the vehicle can travel relatively large distances from start-up, positional information can typically be stored as double-precision floating-point data such that sufficient bits are available to store the positional data. Double-precision floating-point data can, however, be computationally inefficient compared to single-precision floating-point data, which requires 32-bit computing when compared to the 64-bit computing required for double-precision floating-point data. Furthermore, rounding errors can occur when utilising floating-point arithmetic with relatively large numbers.

To combat this, where positional information is stored in memory 116 relative to an origin point of a coordinate system, the navigation system 102 of the vehicle 100 of FIG. 1 can determine new coordinate systems, as needed, in which further positional information can be referenced. For example, where a first set of positional information is determined relative to a first origin point of a first coordinate system, the controller 116 can, in response to a determination that a condition has been met, determine a second coordinate system comprising a second origin point different to the first origin point, with a second set of positional information then determined relative to the second origin point.

Figure 2:
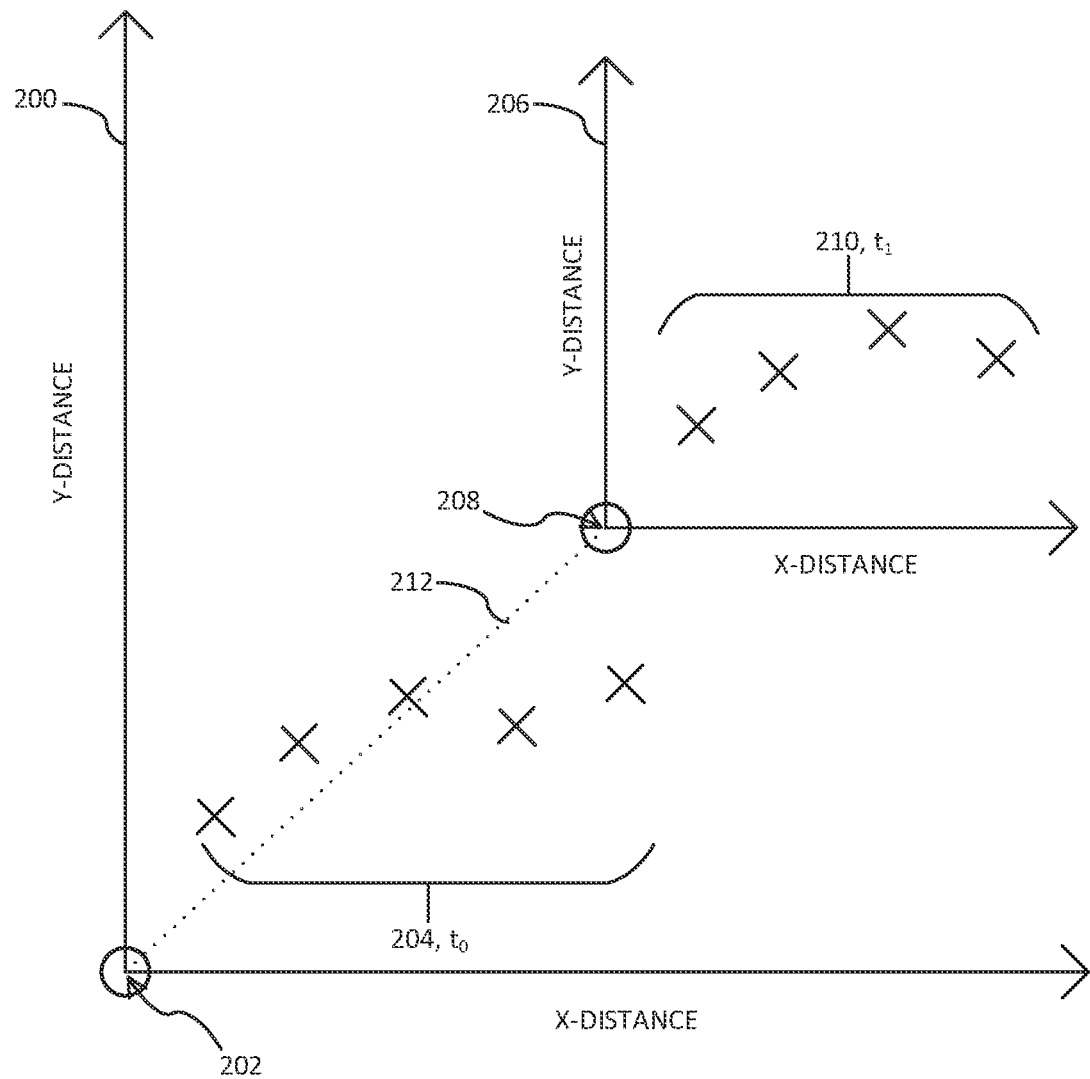
FIG. 2 is a schematic illustration of a shift in coordinate system.

Such determination of a second coordinate system is illustrated schematically in FIG. 2. Here a first coordinate system 200, illustrated as a two-dimensional coordinate system having an x-axis and a y-axis, comprises a first origin point 202. Whilst illustrated as a two-dimensional coordinate system, it will be appreciated that coordinate systems having higher orders of dimensionality are also envisaged. A first set of positional information, generally indicated 204, is referenced relative to the first origin point 202. The first set of positional information 204 is taken at a time $t_0$. A second coordinate system 206, again illustrated as a two-dimensional coordinate system having an x-axis and a y-axis, comprises a second origin point 208, with the second origin point 208 shifted relative to the first origin point 202. A second set of positional information, generally indicated 210, is referenced relative to the second origin point 208, with the second set of positional information 210 taken at time $t_1$.

As can be seen, a magnitude of coordinates of points of the second set of positional information 210 is smaller when referenced relative to the second origin point 208 than if it were to be referenced relative to the first origin point 202. This can enable storing of the second set of positional information 210 in the memory 116 of the vehicle 100 as single-precision floating-point data in the manner previously described. It will be appreciated that this concept can be extended such that many new coordinate systems, each having a corresponding origin point, can be obtained during operation of the vehicle 100, for example between vehicle start-up and vehicle shut-down. It will further be appreciated that the coordinate systems, for example the origin points of coordinate systems, and the positional information in those coordinate systems, can be stored in memory 116 for future analysis if needed.

The drive system 106 can then act on the positional information, for example the first set of positional information 204 and/or the second set of positional information 210, to drive the vehicle 100. The drive system 106 can include any of a high voltage battery, a motor to propel the vehicle 100, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

In some examples, the first coordinate system 200 can comprise a global coordinate system, for example a global coordinate system obtained on vehicle start-up, and the second coordinate system 206 can comprise a local coordinate system. In other examples, the first coordinate system 200 can comprise a first local coordinate system, and the second coordinate system 206 can comprise a second local coordinate system. It will be appreciated that certain components of the navigation system 102, for example the planning component 112, can operate using local coordinate systems, whereas other vehicle components, including other components of the navigation system, can operate using the global coordinate system. As will be described in further detail later herein, an offset 212 between the first origin point 202 and the second origin point 208 can be stored in memory 116 to enable conversion between coordinate systems, such that positional information can be provided to components in the required coordinate system.

In examples discussed herein, the navigation system 102 of the vehicle 100 of FIG. 1 can determine whether a condition has been met, and in response to determining that the condition has been met the navigation system 102 can determine new coordinate systems in the manner described above.

For example, the navigation system 102 of the vehicle 100, or navigation sub-systems such as the localization component 108, the perception component 110, and the planning component 112, can operate in cycles, with an updated set of positional information determined in each cycle. The condition can then correspond to a start or end of such a cycle, with the start or end of a cycle acting as a trigger for the controller 104 to determine a new coordinate system having a new origin point.

A cycle, also referred to as a tick, of the navigation system 102, or navigation sub-systems such as the localization component 108, the perception component 110, and the planning component 112, may be relatively short, for example of the order of hundreds of microseconds to ensure accurate and up-to-date trajectories. Thus by determining a new coordinate system at the start or end point of a cycle of the navigation system 102, or navigation sub-systems such as the localization component 108, the perception component 110, and the planning component 112, the values of the sets of positional information may be kept relatively small which may enable storing of the sets of positional information as single-precision floating-point data, leading to greater computational efficiency, whilst also resulting in a lower risk of rounding errors compared to utilization of larger numbers in floating-point arithmetic. Furthermore, by determining a new coordinate system at the start or end point of a cycle of the navigation system 102, or navigation sub-systems such as the localization component 108, the perception component 110, and the planning component 112, testing and validation of the vehicle 100 in which such a method is utilised may be facilitated, compared to, for example, a method where the vehicle 100 has to travel a certain relatively large distance before modification of the origin point occurs.

In some examples, the condition can comprise an availability of computing resource of the vehicle 100, for example that an availability of computing resource of the vehicle 100 is greater than or equal to an availability threshold. Where computing resource availability is below the availability threshold, it may be the case that determination of a new coordinate system in the manner previously described can overburden the vehicle. Thus by determining a new coordinate system where an availability of computing resource of the vehicle 100 is greater than or equal to an availability threshold, it may be the case that overburdening of the vehicle 100 can be avoided, which may provide improved safety and reliability for the vehicle 100.

In some examples, the condition can comprise that a speed of the vehicle 100 is less than or equal to a speed threshold. Where the vehicle 100 is travelling at a speed below the speed threshold, a new coordinate system can be determined with a new origin point, with future determined positional information referenced relative to the new origin point. For example, a speed threshold can be set based on one or more considerations, such as safety considerations, as to when is appropriate to update the coordinate system relative to which the positional information is referenced. In some examples the speed threshold can be 50MPH, 40MPH, 30MPH, 20MPH, 10MPH, or 5MPH. By updating the coordinate system at relatively low speeds, any subtle shifts in positional information that could potentially be exaggerated at relatively high speeds, for example due to the increased distance travelled at relatively high speeds, may be avoided. A speed of the vehicle 100 can be determined by one or more sensors of the sensor system(s) 114.

Another example of the condition can comprise that the vehicle 100 is stationary. In a similar manner to that described in relation to the speed threshold above, it may be determined that an appropriate time to determine a new coordinate system, for example due to one or more considerations such as safety considerations, is when the vehicle 100 is stationary.

In some examples, the condition can comprise that the vehicle 100 has travelled a distance greater than or equal to a threshold distance. For example, the threshold distance can be 1 km, 2 km, 5 km, 10 km, 25 km, 50 km, or 100 km. In such a manner a magnitude of the positional information may be inhibited from becoming relatively large, enabling storage of the positional information as single-precision floating-point data as previously discussed. A distance travelled by the vehicle 100 can be determined by one or more sensors of the sensor system(s) 114. In some example, a global coordinate system can be obtained on start-up of the vehicle, with the global coordinate system comprising a global origin point. The global origin point can then correspond to a position of the vehicle 100 at vehicle start-up, i.e. when the vehicle is turned on. The condition can then comprise that the vehicle 100 has travelled a distance greater than or equal to a threshold distance from the global origin point. In general, the threshold distance can comprise a distance measured from an origin point of a currently utilised coordinate system.

For example, and as previously mentioned, a coordinate system may be determined many times between vehicle start-up and shut-down, thereby keeping a magnitude of values of the positional information to a minimum. The distance can be 1 km, 2 km, 5 km, 10 km, 25 km, 50 km, or 100 km, from a currently utilised origin point.

In some examples the condition can include that a time period greater than a time threshold has elapsed, for example with the time threshold measured a since initialization or since the origin point was last determined. In some examples the time threshold can comprise 10 μs, 50 μs, 100 μs, 200 μs, 500 μs, 1 ms, 5 ms, 10 ms, 1 s, 5 s, or 10 s.

Another example of the condition includes that the vehicle 100 is travelling on a road type. For example, the condition may comprise that the vehicle 100 is travelling on any of a relatively straight road, a highway, or a rural road. Determining a new coordinate system when the vehicle 100 is travelling on a relatively straight road or a highway may enable the coordinate system to be determined at a point where it is determined that no or relatively little change in position of the vehicle, or surrounding vehicles, is likely to take place. Determining a new coordinate system when the vehicle 100 is travelling on a rural road may enable the coordinate system to be determined at a point where it is determined that relatively few other vehicles are likely to be in the surrounding environment of the vehicle 100. A road type on which the vehicle 100 is travelling can be determined by one or more sensors of the sensor system(s) 114, and/or such information can be received from an off-vehicle source.

The condition can comprise that the vehicle is travelling on a particular type of road surface, for example any of a wet road, a dry road, a relatively smooth road surface, or a relatively rough road surface. A type of road surface on which the vehicle 100 is travelling can be determined by one or more sensors of the sensor system(s) 114, and/or such information can be received from an off-vehicle source.

In some examples, the condition can comprise that the vehicle 100 is travelling in a geographic location. For example, instead of explicitly monitoring a distance travelled by the vehicle 100, for example from a global or currently utilised origin point, a new coordinate system can be determined when it is determined that the vehicle 100 enters or leaves a particular geographic location, for example a road, a town, city, county, or particular region thereof. A geographic location in which the vehicle 100 is travelling can be determined by one or more sensors of the sensor system(s) 114, and/or such information can be received from an off-vehicle source.

Another example of the condition comprises that a number of objects proximate the vehicle 100 is less than or equal to a numerical threshold. For example, it may be determined to be appropriate, e.g. based on safety considerations, to determine a new coordinate system when there are relatively few objects proximate the vehicle. The numerical threshold can comprise any of 100 objects, 75 objects, 50 objects, 25 objects, 10 objects, 5 objects, 2 objects, or 1 object. An object can be determined to be proximate to the vehicle when the object is within 1m, within 2m, within 5m, within 10m, within 25m, within 50m, or within 100m. A number of objects and/or their relative distance to the vehicle 100 can be determined by one or more sensors of the sensor system(s) 114 and/or the localization component 108 and/or the perception component 110.

In some examples, the condition can comprise that an object proximate the vehicle 100 comprises a class of object. The class of object can comprise any of a moving object, a stationary object, a pedestrian, a vehicle, or an inanimate object. An object can be determined to be proximate to the vehicle when the object is within 1m, within 2m, within 5m, within 10m, within 25m, within 50m, or within 100m. A class of an object can be determined in some examples by one or more sensors of the sensor system(s) 114 and/or the perception component 110.

In some examples, the condition can comprise that one or more objects are more than a threshold distance away from the vehicle 100 and/or absent from an environment proximate the vehicle. The threshold distance can comprise 1m, 2m, 5m, 10m, 25m, 50m, or 100m.

Referring back to the example of FIG. 2, as determining the second coordinate system 206 and the second origin point 208 of the second coordinate system 206, the navigation system can determine an offset 212 between the first origin point 202 and the second origin point 208. The offset 212 can then be stored in the memory 116 of the vehicle 100. Storing the offset 212 in such a manner can enable the second set of positional information 210 to be converted from the second coordinate system 206 to the first coordinate system 200, if so desired, thereby obtaining a converted set of positional information.

For example, where the first coordinate system 200 comprises a global coordinate, vehicle sub-systems, for example such as any of the navigation system 102 components including the localization component 108, the perception component 110, and the planning component 112, may at certain times need to utilise positional information referenced relative to the global origin point of the global coordinate system. By storing the offset 212 in the memory 116, the second set of positional information 210 can be converted as and when needed. In some examples, such conversion can take place where the vehicle 100 is stationary, for example where calculation run-time is of lesser importance when compared to calculation run-time when the vehicle 100 is in motion.

In some examples the offset 212 can be stored as double-precision floating-point data, which may enable relatively large offsets to be stored. Calculations utilising double-precision floating-point data can, in some examples, be performed where the vehicle 100 is stationary.

Whilst described above in relation to a global coordinate system, it will be appreciated that offsets between origin points of any previously and subsequently determined coordinate systems can be determined by the navigation system 102 and stored in the memory 116 of the vehicle 100. By storing offsets between sequentially determined origin points, offsets can remain relatively small, which may enable storing of offsets as single-precision floating-point data in the memory 116 of the vehicle 100.

One example of positional information that can be referenced relative to coordinate systems in the manner discussed in relation to FIGS. 1 and 2 is trajectory information, such as planned trajectories, determined by the planning component 112.

As indicated above, in general, the planning component 112 can determine a path for the vehicle 100 to follow to traverse through an environment. For example, the planning component 112 can determine a route to travel from a first location (e.g., a current location) to a second location (e.g., a target location). For the purpose of this discussion, a route can be a sequence of waypoints for travelling between two locations. Further, the planning component 112 can generate an instruction for guiding the vehicle 100 along at least a portion of the route from the first location to the second location. In at least one example, the planning component 112 can determine how to guide the vehicle 100 from a first waypoint in the sequence of waypoints to a second waypoint in the sequence of waypoints. In some examples, the instruction can be a trajectory, or a portion of a trajectory.

Figure 3:
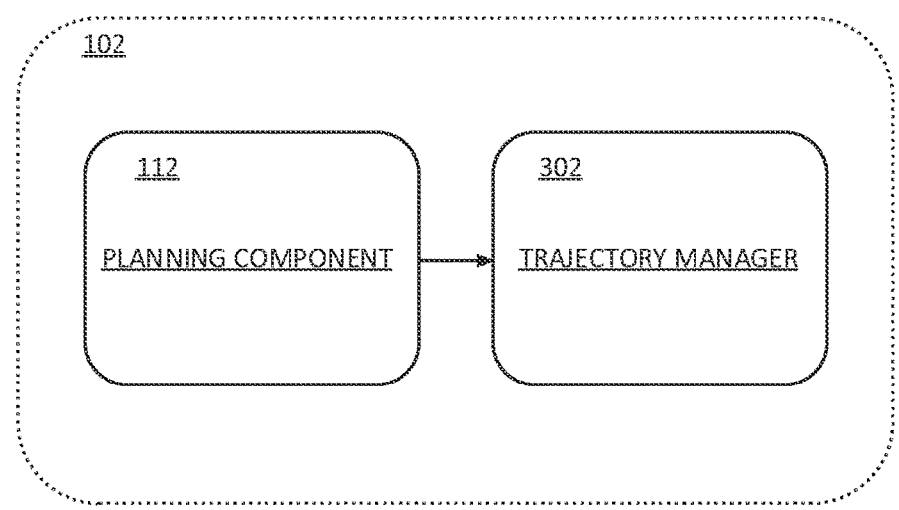
FIG. 3 is a schematic illustration of a planning component of a vehicle.

Part of the navigation system 102 is schematically illustrated in FIG. 3. The navigation system 102 comprises the planning component 112 and a trajectory manager 302. The planning component 112 can plan one or more trajectories of the vehicle 100, and pass the planned trajectories to the trajectory manager 302. The trajectory manager 302 can receive information from any of the sensor system(s) 114, the localization component 108, and the perception component 110, along with the planned trajectories, and can process received information to determine and output an appropriate trajectory for the vehicle 100 to take to avoid collisions with any objects in its surrounding environment. Such processing can include determining whether a trajectory of the vehicle 100 intersects with a position or predicted position of one or objects in the surrounding environment of the vehicle 100.

A trajectory output by the trajectory manager 302 can be measured relative to an origin point of a coordinate system, as previously discussed. For example, a trajectory output by the trajectory manager 302 can include a set of location points measured relative to an origin point of a coordinate system. This is illustrated in FIG. 4, where a first set of location points 400 indicative of a first trajectory output by the trajectory manager 302 are measured relative to a first origin point 402 of a first coordinate system 404.

It will be appreciated that the trajectory manager 302 can output updated trajectories at regular intervals. In some examples each additional trajectory output by the trajectory manager 302 includes a set of location points measured relative to an origin point of an updated coordinate system relative to the previously utilised coordinate system. For example, FIG. 4 illustrates a second set of location points 406 indicative of a second trajectory output by the trajectory manager 302 measured relative to a second origin point 408 of a second coordinate system 410, and a third set of location points 412 indicative of a third trajectory output by the trajectory manager 302 measured relative to a third origin point 414 of a third coordinate system 416.

Figure 4:
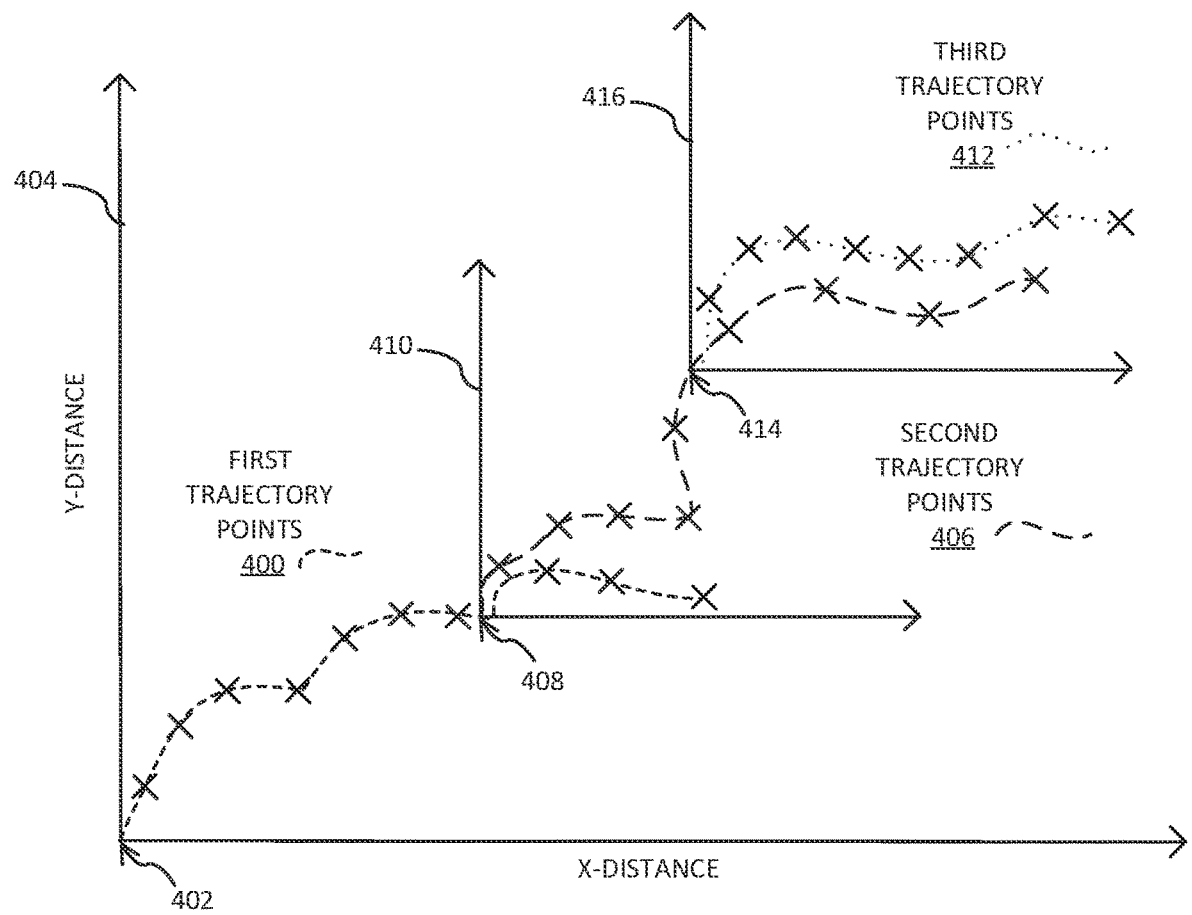
FIG. 4 is a schematic illustration of a shift in coordinate system in the context of the planning component of FIG. 3.

In the example of FIG. 4, the second origin point 408 of the second coordinate system 410 can be taken to be the start point of the second trajectory output by the trajectory manager 302. A portion of the first trajectory not travelled is indicated with a short-dashed line in the second coordinate system 410. Similarly, in the example of FIG. 4 the third origin point 414 of the third coordinate system 416 can be taken to be the start point of the third trajectory output by the trajectory manager 302. A portion of the second trajectory not travelled is indicated with a long-dashed line in the third coordinate system 416.

Here it will be recognized that the example of FIG. 4 is an example where the condition that causes determination of a new coordinate is the start/end of a cycle trajectory manager 302, for example such that a new coordinate system is utilised every cycle or tick of the trajectory manager 302. However, other pre-determined conditions, for example those discussed previously herein, may also be utilised in conjunction with the trajectory information output by the trajectory manager 302. In such circumstances the coordinate system may not necessarily be updated every cycle or tick of the trajectory manager 302, but may instead be updated, for example, when the vehicle 100 is determined to be stationary etc.

Whilst updating of the coordinate system has been described with reference to FIG. 4 as taking place at the output of the trajectory manager 302, it will be appreciated that in practice the updating of the coordinate system can take place at different positions within the pipeline of the navigation system 102. Indeed, updating of the coordinate system can take place at at least one of the input of the planning component 112, the output of the planning component 112, the input of the trajectory manager 302 and the output of the trajectory manager 302. In some examples, updating of the coordinate system can take place to enable components of the vehicle 100, such as the planning component 112 and the trajectory manager 302 to operate more efficiently. For example, the planning component 112 may utilise one or more GPUs that may operate more efficiently using single-precision floating-point data, and so updating of the coordinate system can take place at the input of the planning component 112.

Similar to the manner previously described, the first 400, second 406 and third 412 sets of location points can be stored in the memory 116 of the vehicle 100 as single-precision floating-point data. Offsets between any of the first 402, second 408 and third 414 origin points can be stored in the memory 116 of the vehicle 100 as either single-precision floating-point data or double-precision floating-point data.

The planning component 112 may need to interact with other vehicle sub-systems, including sub-systems of the vehicle navigation system 102, and to do so the information utilised by the planning component 112 may also need to be convertible to a data format suitable for interaction with such sub-systems. In a similar manner to that previously discussed, an offset between the coordinate systems utilised by the planning component 112 can be stored in memory 116 of the vehicle 100, such that the sets of location points can be converted into a previously utilised coordinate system, or indeed converted into double-precision floating-point data, if so required. As an example, the first coordinate system 404 can comprise a global coordinate system, with the second coordinate system 410 and the third coordinate system 416 comprising local coordinate systems. Here, some components of the vehicle 100 may need to operate with positional information in the global coordinate system, and so the second set of location points 406 and the third set of location points 412 can be transformed into the first, global, coordinate system 404 via use of appropriate offsets.

Figure 5:
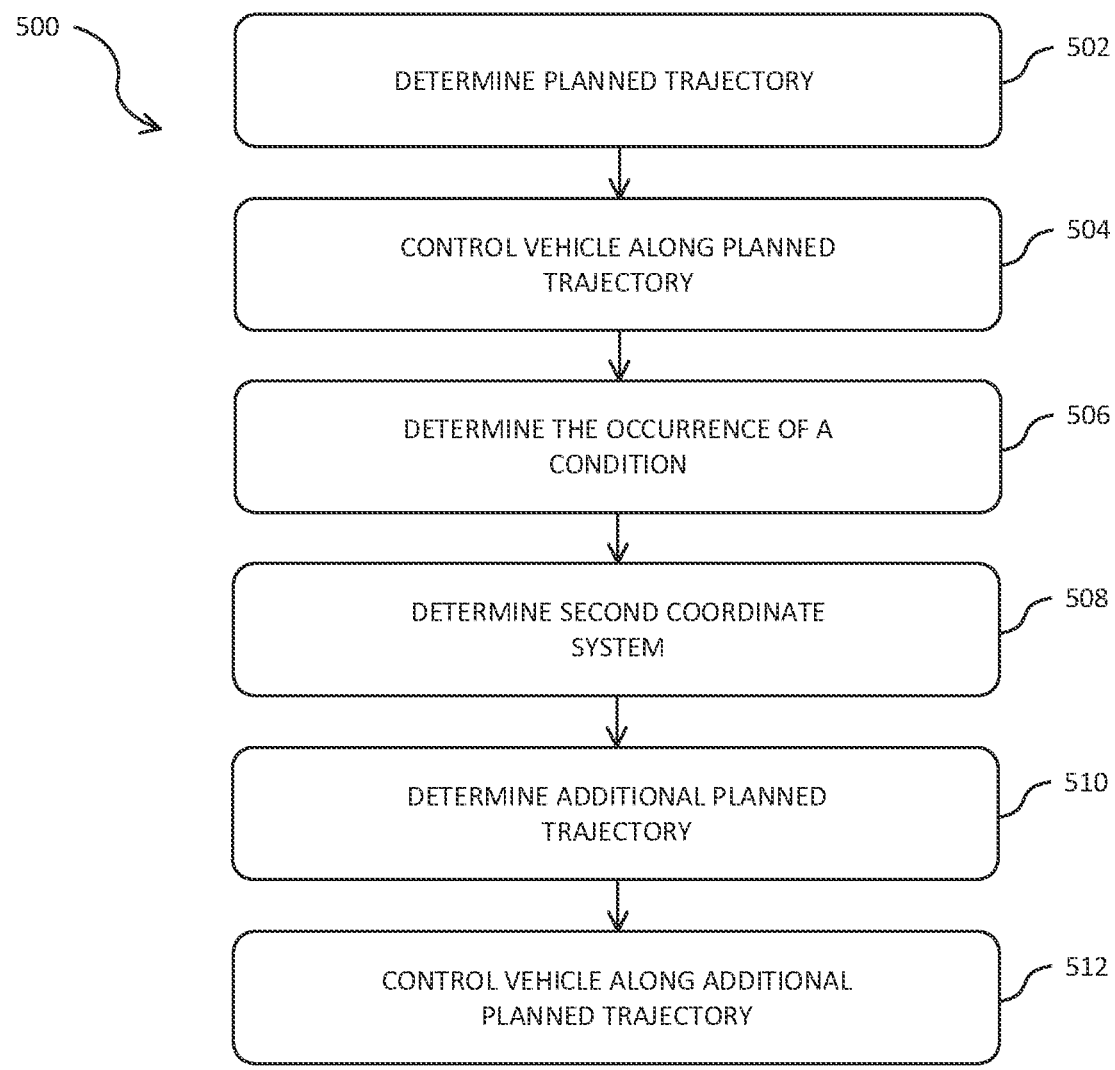
FIG. 5 is a flow diagram illustrating a shift in coordinate system.

The offset can comprise any of an offset between the first origin point 402 of the first coordinate system 404 and the second origin point 408 of the second coordinate system 410, an offset between the second origin point 408 of the second coordinate system 410 and the third origin point 414 of the third coordinate system 416, and an offset between the first origin point 402 of the first coordinate system 404 and the third origin point 414 of the third coordinate system 416. The offsets can be a translation, although rotation is also envisaged where such rotation minimizes distances relative to an origin point. A method 500 in accordance with the example of FIG. 4 is illustrated in the flow diagram of FIG. 5.

The method 500 comprises determining 502, based at least in part on a first coordinate system comprising a first origin, a planned trajectory for a vehicle.

The method 500 comprises controlling 504 the vehicle to move along the planned trajectory.

The method 500 comprises determining 506 the occurrence of a condition, such as, but not limited to, one or more of: a start or end point of a cycle of a trajectory planner associated with at least one of the planned trajectory or the additional planned trajectory, an availability of computing resource of the vehicle, a speed of the vehicle is less than or equal to a speed threshold, the vehicle is stationary, the vehicle has travelled a distance greater than or equal to a threshold distance, the vehicle is travelling on a road type, the vehicle is travelling on a type of road surface, the vehicle is travelling in a geographic location, a number of objects proximate the vehicle is less than or equal to a numerical threshold, an object proximate the vehicle is of a class, or an object is less than or equal to a threshold distance from the vehicle.

The method 500 comprises, determining 508 a second coordinate system comprising a second origin and based at least in part on the condition.

The method 500 comprises determining 510, based at least in part on the second coordinate system, an additional planned trajectory for the vehicle.

The method 500 comprises controlling 512 the vehicle to move along the additional planned trajectory.

Figure 6:
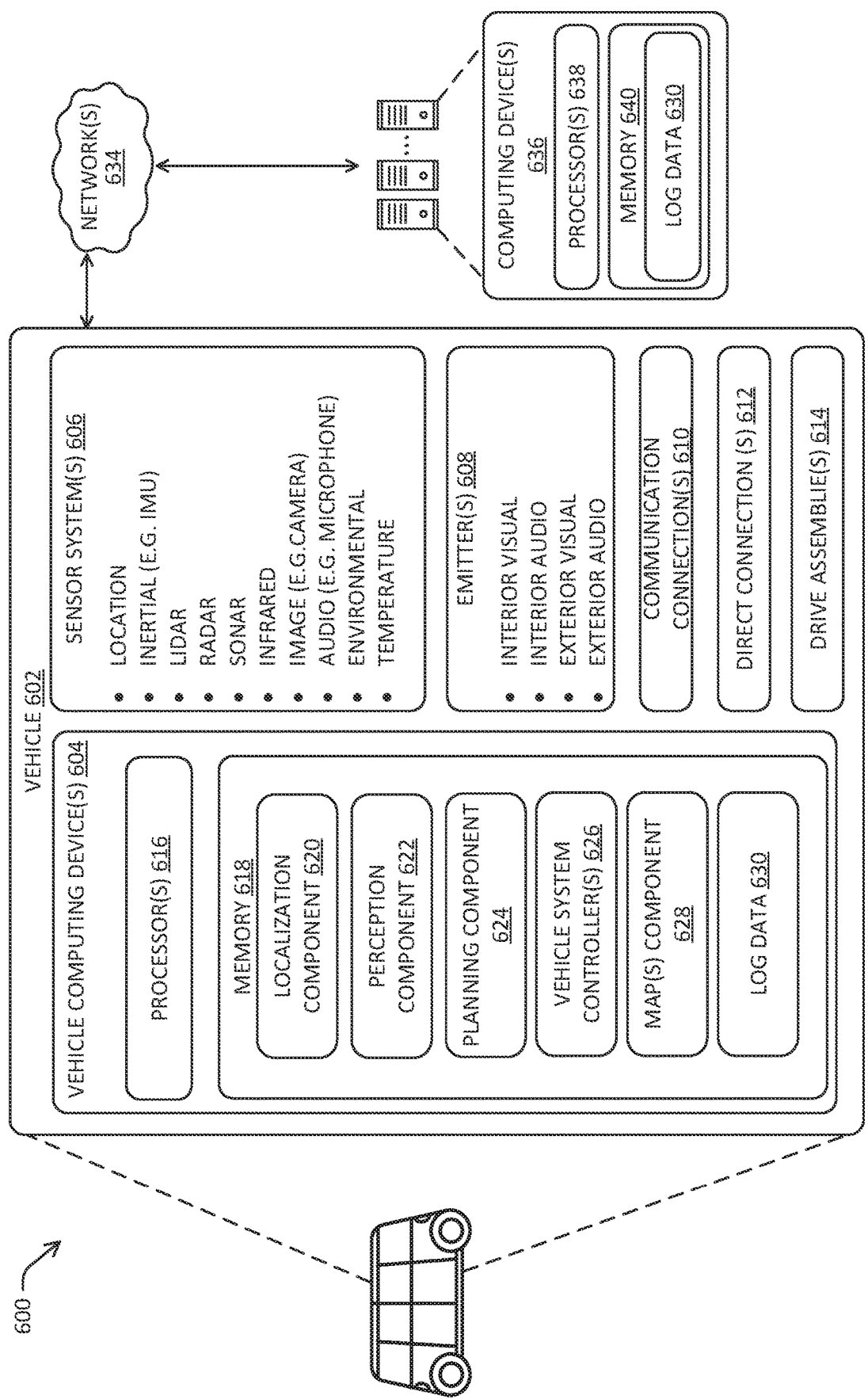
FIG. 6 is a schematic illustration of a system comprising a vehicle and one or more computing device(s).

FIG. 6 is a block diagram illustrating an example system 600 for implementing some of the various technologies described herein. In some examples, the system 600 may include one or multiple features, components, and/or functionality of examples described herein with reference to other figures.

The system 600 may include a vehicle 602. In some examples, the vehicle 602 can include some or all of the features, components, and/or functionality described above with respect to the vehicle 100. The vehicle 602 can comprise a bidirectional vehicle. As shown in FIG. 6, the vehicle 602 can also include a vehicle computing device 604, one or more sensor systems 604, one or more emitters 608, one or more communication connections 610, one or more direct connections 612, and/or one or more drive assemblies 614.

The vehicle computing device 604 can, in some examples, include one or more processors 616 and memory 618 communicatively coupled with the one or more processors 616. In examples, the one or more processors 616 may execute instructions stored in the memory 618 to perform one or more operations on behalf of the one or more vehicle computing devices 604.

The memory 618 of the one or more vehicle computing devices 604 can store a localization component 620, a perception component 622, a planning component 624, one or more vehicle system controllers 626, a map(s) component 628, and log data 630. Though depicted in FIG. 6 as residing in memory 618 for illustrative purposes, it is contemplated that the localization component 620, perception component 622, planning component 624, one or more vehicle system controllers 626, map(s) component 628, and/or the log data 630 can additionally, or alternatively, be accessible to the vehicle 602 (e.g., stored on, or otherwise accessible from, memory remote from the vehicle 602, such as memory 640 of one or more computing devices 636). The localization component 620, the perception component 622, and the planning component 624 can include some or all of the features, components, and/or functionality described above with respect to the localization component 108, then perception component 110, and the planning components 112.

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 606 or received from one or more other devices (e.g., computing devices 636) to accurately determine a location of the autonomous vehicle. In some instances, the localization component 620 can provide data to various components of the vehicle 602 to determine an initial position of the autonomous vehicle for generating a trajectory and/or for determining to retrieve map data. In various examples, the localization component 620 can provide data to a web-based application that may generate a data visualization associated with the vehicle 602 based at least in part on the data. In some examples the determined position and/or orientation of the vehicle 602 can be measured with reference to coordinate systems that are updated in response to pre-determined conditions being met, as previously described.

In some instances, the perception component 622 can include functionality to perform object tracking, detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 622 may provide data to a web-based application that generates a data visualization associated with the vehicle 602 based at least in part on the data. In some examples the determined position of detected entities can be measured with reference to coordinate systems that are updated in response to pre-determined conditions being met, as previously described.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate. In some examples the determined trajectories and/or waypoints can be measured with reference to coordinate systems that are updated in response to pre-determined conditions being met, as previously described.

In at least one example, the vehicle computing device 604 can include one or more vehicle system controllers 626, which can be configured to control steering, propulsion, braking, safety, emitters, communication, components, and other systems of the vehicle 602. These vehicle system controller(s) 626 can communicate with and/or control corresponding systems of the drive assembly(s) 614 and/or other components of the vehicle 602.

The memory 618 can further include the map(s) component 628 to maintain and/or update one or more maps (not shown) that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 602 can be controlled based at least in part on the maps. That is, the maps can be used in connection with the localization component 620, the perception component 622, and/or the planning component 624 to determine a location of the vehicle 602, identify objects in an environment, and/or generate routes and/or trajectories to navigate within an environment. Additionally, the maps can be used in connection with the web-based application to generate content associated with the vehicle 602, such as a data visualization.

In some examples, the one or more maps can be stored on a remote computing device(s) (accessible via one or more network(s)). In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 618 may also store log data 630 associated with the vehicle. For instance, the log data 630 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 630.

In some instances, aspects of some or all of the memory-stored components discussed herein can include any models, algorithms, and/or machine learning algorithms. For example, in some instances, components in the memory 618 such as the localization component 620, the perception component 622, and/or the planning component 624 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 606 can include multiple instances of each of these or other types of sensors. For instance, the lidar sensors can include individual lidar sensors located at the corners, front, back, sides, and/or top of the vehicle 602. As another example, the image sensors can include multiple image sensors disposed at various locations about the exterior and/or interior of the vehicle 602. As an even further example, the audio sensors can include multiple audio sensors disposed at various locations about the exterior and/or interior of the vehicle 602. Additionally, the audio sensors can include an array of a plurality of audio sensors for determining directionality of audio data. The sensor system(s) 606 can provide input to the vehicle computing device 604. Additionally, or alternatively, the sensor system(s) 606 can send sensor data, via the one or more networks 634, to the one or more computing device(s) 636 at a particular frequency, after a lapse of a predetermined period of time, in near real-time, etc.

The vehicle 602 can also include one or more emitters 608 for emitting light and/or sound. The emitters 608 in this example include interior audio and visual emitters to communicate with passengers of the vehicle 602. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive assembly(s) 614. Also, the communication connection(s) 610 can allow the vehicle 602 to communicate with other nearby computing device(s) (e.g., other nearby vehicles, traffic signals, laptop computers, etc.). The communications connection(s) 610 also enable the vehicle 602 to communicate with a remote teleoperations system or other remote services.

The communications connection(s) 610 can include physical and/or logical interfaces for connecting the vehicle computing device(s) 604 to another computing device (e.g., computing device(s) 636) and/or a network, such as network(s) 634. For example, the communications connection(s) 610 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 612 of vehicle 602 can provide a physical interface to couple the one or more drive assembly(s) 614 with the body of the vehicle 602. For example, the direct connection 612 can allow the transfer of energy, fluids, air, data, etc. between the drive assembly(s) 614 and the vehicle 602. In some instances, the direct connection 612 can further releasably secure the drive assembly(s) 614 to the body of the vehicle 602.

In at least one example, the vehicle 602 can include one or more drive assemblies 614. In some examples, the vehicle 602 can have a single drive assembly 614. In at least one example, if the vehicle 602 has multiple drive assemblies 614, individual drive assemblies 614 can be positioned on opposite longitudinal ends of the vehicle 602 (e.g., the leading and trailing ends, the front and the rear, etc.).

The drive assembly(s) 614 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 614 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 614. Furthermore, the drive assembly(s) 614 can also include one or more communication connection(s) that enable communication by the respective drive assembly with one or more other local or remote computing device(s). In such a manner parameters relating to the drive assembly(s) 614, for example relating to the high voltage battery, can be transmitted to the computing device 636.

The computing device(s) 636 can include one or more processors 638 and memory 640 that may be communicatively coupled to the one or more processors 638. In some examples the computing device(s) 636 can store log data 630 or other vehicle information transmitted via the communication connection(s) 610. In some example the processor(s) 638 of the computing device(s) 636 can perform modification of the coordinate systems as described herein, and communicate such modified coordinate systems to the vehicle 602.

The processor(s) 616 of the vehicle 602 and the processor(s) 638 of the computing device(s) 636 can be any suitable processor capable of executing instructions to process data and perform operations as described herein. By way of example and not limitation, the processor(s) 616 and 638 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 640 are examples of non-transitory computer-readable media. The memory 618 and 640 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 6 is illustrated as a distributed system, in alternative examples, components of the vehicle 602 can be associated with the computing device(s) 636 and/or components of the computing device(s) 636 can be associated with the vehicle 602. That is, the vehicle 602 can perform one or more of the functions associated with the computing device(s) 636, and vice versa.

EXAMPLE CLAUSES

A: A method comprising: determining, based at least in part on a first coordinate system comprising a first origin, a planned trajectory for a vehicle; controlling the vehicle to move along the planned trajectory; determining the occurrence of a condition; determining a second coordinate system comprising a second origin and based at least in part on the condition; determining, based at least in part on the second coordinate system, an additional planned trajectory for the vehicle; and controlling the vehicle to move along the additional planned trajectory.

B: A method according to Clause A, wherein the condition comprises one or more of: a start or end point of a cycle of a trajectory planner associated with at least one of the planned trajectory or the additional planned trajectory, an availability of computing resource of the vehicle, a speed of the vehicle is less than or equal to a speed threshold, the vehicle is stationary, the vehicle has travelled a distance greater than or equal to a threshold distance, the vehicle is travelling on a road type, the vehicle is travelling on a type of road surface, the vehicle is travelling in a geographic location, a number of objects proximate the vehicle is less than or equal to a numerical threshold, an object proximate the vehicle is of a class, or an object is less than or equal to a threshold distance from the vehicle.

C: A method according to Clause A or Clause B, wherein the determining the additional planned trajectory comprises determining a set of location points having single-precision floating-point data.

D: A method according to any of Clauses A to C, wherein the method comprises storing, in a memory of the vehicle, an offset between the first origin point and the second origin point.

E: A method according to Clause D, wherein the first coordinate system comprises a global coordinate system obtained on start-up of the vehicle, and the method comprises converting the additional planned trajectory associated with the second coordinate system to a converted trajectory associated with the first coordinate system, and utilising the converted trajectory as input data of one or more vehicle components that require input data in the first coordinate system.

F: A vehicle comprising: a navigation system configured to: determine first and second positional information for controlling the vehicle, the first positional information determined relative to a first origin point of a first coordinate system; determine whether a condition has been met; determine a second coordinate system comprising a second origin point and based at least in part on the condition; determine, based at least in part on the second coordinate system, the second positional information, the second positional information determined relative to the second origin point of the second coordinate system; and a drive system configured to drive the vehicle in response to the first and second positional information.

G: A vehicle according to Clause F, wherein the navigation system is configured to operate in cycles, with updated positional information determined in a cycle, and the condition comprises a start or end point of cycles of the navigation system.

H: A vehicle according to Clause F or Clause G, wherein the comprises at least one of that a speed of the vehicle is less than or equal to a speed threshold, and that the vehicle is stationary.

I: A vehicle according to any of Clauses F to H, wherein the condition comprises that the vehicle has travelled a distance greater than or equal to a threshold distance.

J: A vehicle according to any of Clauses F to I, wherein the pre-determined condition comprises at least one of that the vehicle is travelling on a road type, that the vehicle is travelling on a type of road surface, and that the vehicle is travelling in a geographic location.

K: A vehicle according to any of Clauses F to J, wherein the condition comprises at least one of that a number of objects proximate the vehicle is less than or equal to a numerical threshold, that an object proximate the vehicle is of a class, and that an object is less than or equal to a threshold distance from the vehicle.

L: A vehicle according to any of Clauses F to K, wherein the vehicle comprises a memory, and at least one of the first and second positional information is stored in the memory as floating-point data.

M: A vehicle according to any of Clauses F to L, wherein the planned trajectory is determined based at least in part on single-precision floating point numbers and an offset between the first and second origin points comprises a value stored in a double-precision format.

N: A vehicle according to any of Clauses F to M, wherein the navigation system comprises a trajectory planner for planning a trajectory of the vehicle, the trajectory planner operates at a frequency, and the second origin point is determined based at least in part on a most recently output trajectory from the trajectory planner.

O: A vehicle according to any of Clauses F to N, wherein the vehicle comprises one or more vehicle components that utilise positional information associated with the first coordinate system as input data, and navigation system is configured to convert the second positional information from the second coordinate system to the first coordinate system to obtain a converted set of positional information for use as input data by the one or more vehicle components.

P: A vehicle according to any of Clauses F to O, wherein the first coordinate system comprises a global coordinate system, the second coordinate system comprises a local coordinate system, the vehicle comprises one or more vehicle components that utilise input data in the global coordinate system, and the navigation system is configured to covert the second positional information from the local coordinate system to the global coordinate system to obtain converted positional information for use as input data by the one or more vehicle components Q: One or more non-transitory computer-readable media storing instructions executable by one or more processors of a vehicle, wherein the instructions, when executed, cause the one or more processors to perform operations comprising: determining, based at least in part on a first coordinate system comprising a first origin, a planned trajectory for a vehicle; controlling the vehicle to move along the planned trajectory; determining the occurrence of a condition; determining a second coordinate system comprising a second origin and based at least in part on the condition; determining, based at least in part on the second coordinate system, an additional planned trajectory for the vehicle; and controlling the vehicle to move along the additional planned trajectory.

R: One or more non-transitory computer-readable media according to Clause Q, wherein the condition comprises one or more of: a start or end point of a cycle of a trajectory planner associated with at least one of the planned trajectory or the additional planned trajectory, an availability of computing resource of the vehicle, a speed of the vehicle is less than or equal to a speed threshold, the vehicle is stationary, the vehicle has travelled a distance greater than or equal to a threshold distance, the vehicle is travelling on a road type, the vehicle is travelling on a type of road surface, the vehicle is travelling in a geographic location, a number of objects proximate the vehicle is less than or equal to a numerical threshold, an object proximate the vehicle is of a class, or an object is less than or equal to a threshold distance from the vehicle.

S: One or more non-transitory computer-readable media according to Clause Q or Clause R, wherein the operations comprise comprises storing, in a memory of the vehicle, an offset between the first origin point and the second origin point.

T: One or more non-transitory computer-readable media according to Clause S, wherein the first coordinate system comprises a global coordinate system obtained on start-up of the vehicle, and the operations comprise converting the additional planned trajectory associated with the second coordinate system to a converted trajectory associated with the first coordinate system, and utilising the converted trajectory as input data of one or more vehicle components that require input data in the first coordinate system.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A method comprising:
   determining, based at least in part on a first coordinate system comprising a first origin, a planned trajectory for a vehicle;
   controlling the vehicle to move along the planned trajectory;
   determining an occurrence of a condition;
   determining a second coordinate system comprising a second origin and based at least in part on the condition, the second origin of the second coordinate system comprising a translation with respect to the first origin of the first coordinate system;
   determining, based at least in part on the second coordinate system, an additional planned trajectory for the vehicle, the planned trajectory and the additional planned trajectory comprising the same type of trajectory, the planned trajectory and the additional planned trajectory determined based on single-precision floating point numbers and an offset between the first origin and second origin comprises a value stored in a double-precision format; and
   controlling the vehicle to move along the additional planned trajectory.

2. A method as claimed in claim 1, wherein the condition comprises one or more of:
   a start or end point of a cycle of a trajectory planner associated with at least one of the planned trajectory or the additional planned trajectory,
   an availability of computing resource of the vehicle,
   a speed of the vehicle is less than or equal to a speed threshold,
   the vehicle is stationary,
   the vehicle has travelled a distance greater than or equal to a threshold distance,
   the vehicle is travelling on a road type,
   the vehicle is travelling on a type of road surface,
   the vehicle is travelling in a geographic location,
   a number of objects proximate the vehicle is less than or equal to a numerical threshold,
   an object proximate the vehicle is of a class, or
   the object is less than or equal to a threshold distance from the vehicle.

3. A method as claimed in claim 1, wherein the determining the additional planned trajectory comprises determining a set of location points having single-precision floating-point data.

4. A method as claimed in claim 1, wherein the method comprises storing, in a memory of the vehicle, the offset between the first origin and the second origin.

5. A method as claimed in claim 4, wherein the first coordinate system comprises a global coordinate system obtained on start-up of the vehicle, and the method comprises converting the additional planned trajectory associated with the second coordinate system to a converted trajectory associated with the first coordinate system, and utilising the converted trajectory as input data of one or more vehicle components that require the input data in the first coordinate system.

6. A vehicle comprising:
   one or more processors; and
   one or more non-transitory computer-readable media storing instructions that, when executed, cause the one or more processors to perform operations comprising:
      determining first and second positional information for controlling the vehicle, the first positional information determined relative to a first origin point of a first coordinate system and comprising a first trajectory;
      determining whether a condition has been met;
      determining a second coordinate system comprising a second origin point and based at least in part on the condition, the second origin point of the second coordinate system comprising a translation with respect to the first origin point of the first coordinate system;
      determining, based at least in part on the second coordinate system, the second positional information, the second positional information determined relative to the second origin point of the second coordinate system and comprising a second trajectory, the first positional information and the second positional information determined based on single-precision floating point numbers and an offset between the first origin point and second origin point comprises a value stored in a double-precision format; and
      controlling the vehicle to move in response to the first and second positional information.

7. A vehicle as claimed in claim 6, the operations comprising determining updated positional information in cycles, wherein the condition comprises a start or end point of the cycles.

8. A vehicle as claimed in claim 6, wherein the condition comprises at least one of that a speed of the vehicle is less than or equal to a speed threshold, and that the vehicle is stationary.

9. A vehicle as claimed in claim 6, wherein the condition comprises that the vehicle has travelled a distance greater than or equal to a threshold distance.

10. A vehicle as claimed in claim 6, wherein the condition comprises at least one of that the vehicle is travelling on a road type, that the vehicle is travelling on a type of road surface, and that the vehicle is travelling in a geographic location.

11. A vehicle as claimed in claim 6, wherein the condition comprises at least one of that a number of objects proximate the vehicle is less than or equal to a numerical threshold, that an object proximate the vehicle is of a class, and that the object is less than or equal to a threshold distance from the vehicle.

12. A vehicle as claimed in claim 6, wherein the vehicle comprises a memory, and at least one of the first and second positional information is stored in the memory as floating-point data.

13. A vehicle as claimed in claim 6, where the navigation system the operations comprising planning a trajectory of the vehicle, the planning the trajectory operating at a frequency, the second origin point determined based at least in part on a most recently output trajectory.

14. A vehicle as claimed in claim 6, wherein the vehicle comprises one or more vehicle components that utilise the first positional information associated with the first coordinate system as input data, and the operations comprising converting the second positional information from the second coordinate system to the first coordinate system to obtain a converted set of positional information for use as the input data by the one or more vehicle components.

15. A vehicle as claimed in claim 6, wherein the first coordinate system comprises a global coordinate system, the second coordinate system comprises a local coordinate system, the vehicle comprises one or more vehicle components that utilise input data in the global coordinate system, and the operations comprising converting the second positional information from the local coordinate system to the global coordinate system to obtain converted positional information for use as input data by the one or more vehicle components.

16. One or more non-transitory computer-readable media storing instructions executable by one or more processors of a vehicle, wherein the instructions, when executed, cause the one or more processors to perform operations comprising:
determining, based at least in part on a first coordinate system comprising a first origin, a planned trajectory for a vehicle;
controlling the vehicle to move along the planned trajectory;
determining an occurrence of a condition;
determining a second coordinate system comprising a second origin and based at least in part on the condition, the second origin of the second coordinate system comprising a translation with respect to the first origin of the first coordinate system;
determining, based at least in part on the second coordinate system, an additional planned trajectory for the vehicle, the planned trajectory and the additional planned trajectory comprising the same type of trajectory, the planned trajectory and the additional planned trajectory determined based on single-precision floating point numbers and an offset between the first origin and second origin comprises a value stored in a double-precision format; and
controlling the vehicle to move along the additional planned trajectory.

17. One or more non-transitory computer-readable media as claimed in claim 16, wherein the condition comprises one or more of:
a start or end point of a cycle of a trajectory planner associated with at least one of the planned trajectory or the additional planned trajectory,
an availability of computing resource of the vehicle,
a speed of the vehicle is less than or equal to a speed threshold,
the vehicle is stationary,
the vehicle has travelled a distance greater than or equal to a threshold distance,
the vehicle is travelling on a road type,
the vehicle is travelling on a type of road surface,
the vehicle is travelling in a geographic location,
a number of objects proximate the vehicle is less than or equal to a numerical threshold,
an object proximate the vehicle is of a class, or
the object is less than or equal to a threshold distance from the vehicle.

18. One or more non-transitory computer-readable media as claimed in claim 16, wherein the operations comprise comprises storing, in a memory of the vehicle, the offset between the first origin and the second origin.

19. One or more non-transitory computer-readable media as claimed in claim 18, wherein the first coordinate system comprises a global coordinate system obtained on start-up of the vehicle, and the operations comprise converting the additional planned trajectory associated with the second coordinate system to a converted trajectory associated with the first coordinate system, and utilising the converted trajectory as input data of one or more vehicle components that require the input data in the first coordinate system.

* * * * *